United States Patent [19]
Wolfe

[11] 3,926,711
[45] Dec. 16, 1975

[54] PORTABLE ROTATING KETTLE USED IN RETREADING TIRES

[75] Inventor: Merritt W. Wolfe, Akron, Ohio

[73] Assignee: The Goodyear Tire & Rubber Company, Akron, Ohio

[22] Filed: Sept. 5, 1972

[21] Appl. No.: 286,382

[52] U.S. Cl. .................................. 156/394; 156/96
[51] Int. Cl.² ............................................ B29H 5/04
[58] Field of Search .......................... 156/94–96, 156/127–129, 110, 123, 125, 394; 264/36, 315, 316, 326, 310, 94; 425/11–19, 24, 25, 32, 39, 40–43, 45, 47, 86, 186, 188, 222, 387, 409, 426, 435, 445, 446, 450; 34/104, 105, 241, 108, 184, 225

[56] References Cited
UNITED STATES PATENTS

| | | | |
|---|---|---|---|
| 1,762,131 | 6/1930 | Denmire | 425/40 |
| 1,762,146 | 6/1930 | Abbott | 156/123 |
| 1,949,473 | 3/1934 | Hopkinson | 264/310 |
| 2,405,802 | 8/1946 | Taber | 264/310 |
| 2,904,842 | 9/1959 | Alm | 156/394 FM |
| 3,038,203 | 6/1962 | Gross | 156/394 FM |
| 3,042,966 | 7/1962 | Laycox | 425/47 |
| 3,686,389 | 8/1972 | Beneze | 156/110 R |
| 3,729,358 | 4/1973 | Barefoot | 156/96 |

FOREIGN PATENTS OR APPLICATIONS

| | | | |
|---|---|---|---|
| 634,953 | 1/1962 | Canada | 156/96 |
| 1,157,770 | 11/1963 | Germany | 425/17 |

Primary Examiner—Douglas J. Drummond
Assistant Examiner—John E. Kittle
Attorney, Agent, or Firm—F. W. Brunner; H. E. Hummer

[57] ABSTRACT

A large rotatable kettle used in retreading or repairing big tires used on large earthmoving equipment. The tire is mounted within the kettle for unitary rotation with the kettle such that each portion of the tire will be exposed to the same temperature gradient within the kettle.

14 Claims, 2 Drawing Figures

PORTABLE ROTATING KETTLE USED IN RETREADING TIRES

BACKGROUND OF THE INVENTION

The invention is especially suited for repairing and retreading large tires used on heavy earthmoving equipment employed in huge mining operations and dam building projects. Such tires have diameters ranging from 6 to 15 feet depending on the size of the trucks or other equipment being used. The terrain over which the tires are driven is very rugged and has sharply pointed rocks which can inflict cuts in the tread and sidewalls of the tire. A rock embedded in a cut in the tire acts like a drill and literally bores through the various reinforced layers of rubber material until the tire is ruined. Such a tire could be salvaged if the injury or cut were repaired immediately. It is not unusual that operators run such damaged tires to ruination and then simply scrap them because of the high cost and obstacles encountered in transporting the damaged tires to a facility having the necessary equipment for handling and repairing large tires.

The problems involved are easily imagined when considering the transportation of a tire having, for example, a diameter of 15 feet. The use of truck transportation presents the most difficult problems because of the height and width restrictions on the load. The tire could never be transported horizontally and, if placed in a vertical position, would require a minimum clearance of about 20 feet which is well above the required standards for truck transportation. Transportation by rail or boat presents fewer problems, but truck transportation, even for short distances, is usually necessary. Many times it is easier to airlift the tires by helicopter to places not readily accessible by rail, boat or truck transportation, but the costs are prohibitive such that this type of transportation is generally avoided. In some cases, it is necessary to transport the tires thousands of miles back to the plant where the tire was originally built in order to repair the tire. The expenses involved are horrendous but minimal compared to the original cost of the tire.

It would be beneficial to both the user and repairman if these tires could be repaired or retreaded on the job site rather than at a remote facility. To accomplish this, it is necessary to develop portable equipment which can be readily moved to and between different job locations. The invention is directed to providing such equipment, especially a large curing kettle which can be used in making major and minor repairs of large earthmover tires, and in retreading such tires.

Briefly stated, the invention is in a kettle used in repairing or retreading tires. The kettle comprises at least two sections which, when closed, form a chamber for receiving a tire. Means are provided for securing the two sections together to seal the chamber from the ambient atmosphere. Means are supplied for mounting the sections for rotation and for mounting a tire within the chamber for unitary rotation with the kettle.

DESCRIPTION OF THE DRAWING

The following description of the invention will be better understood by having reference to the annexed drawing, wherein.

DESCRIPTION OF THE INVENTION

Figure 2:
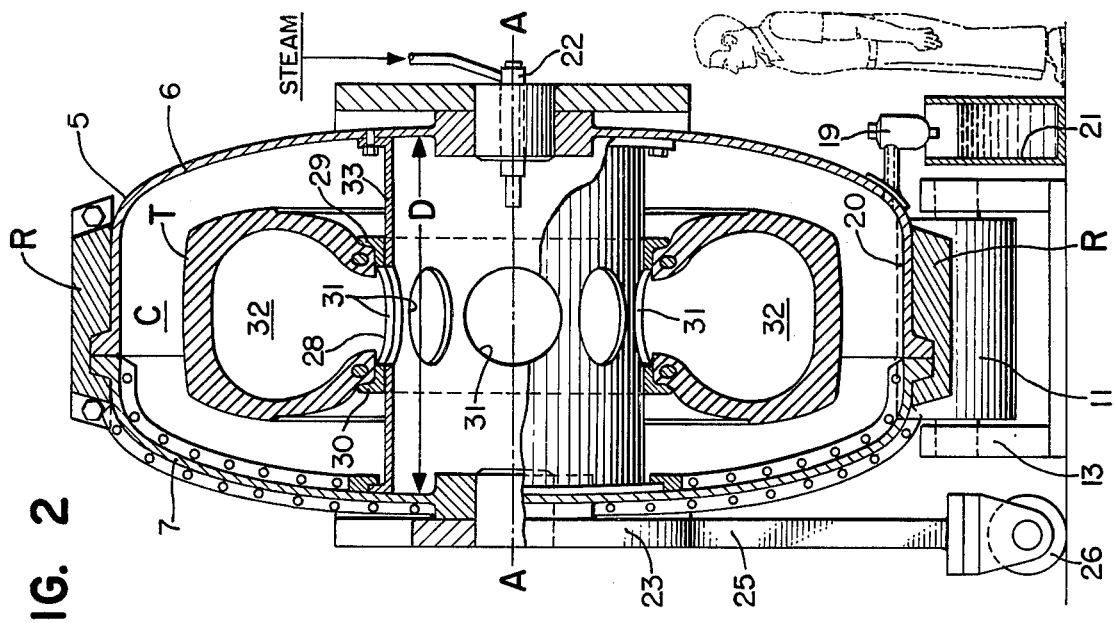
FIG. 2 is a section of the kettle viewed from the line 2—2 of FIG. 1.

Referring generally to the drawing, there is shown a large kettle 5 used in retreading and repairing damaged areas in huge earthmover tires, e.g. tire T. The kettle 5 comprises two sections 6 and 7 which are preferably circular and held together in opposing relation by any suitable locking ring R. The two sections 6 and 7 form a chamber C for receiving the tire T. The sections 6 and 7 are each divided into two segments 8 and 9 for convenience in transporting the kettle 5 between job locations. The two segments 8 and 9 are preferably similar and conveniently bolted together by any suitable means. The four semi-circular segments of the kettle 5 can be nested together in side-by-side relation on the flat bed of a truck and readily transported over most highways, since the height of the trailer and kettle above the roadway measures about 13 feet 6 inches which is within the load requirements for truck transportation.

Figure 1:
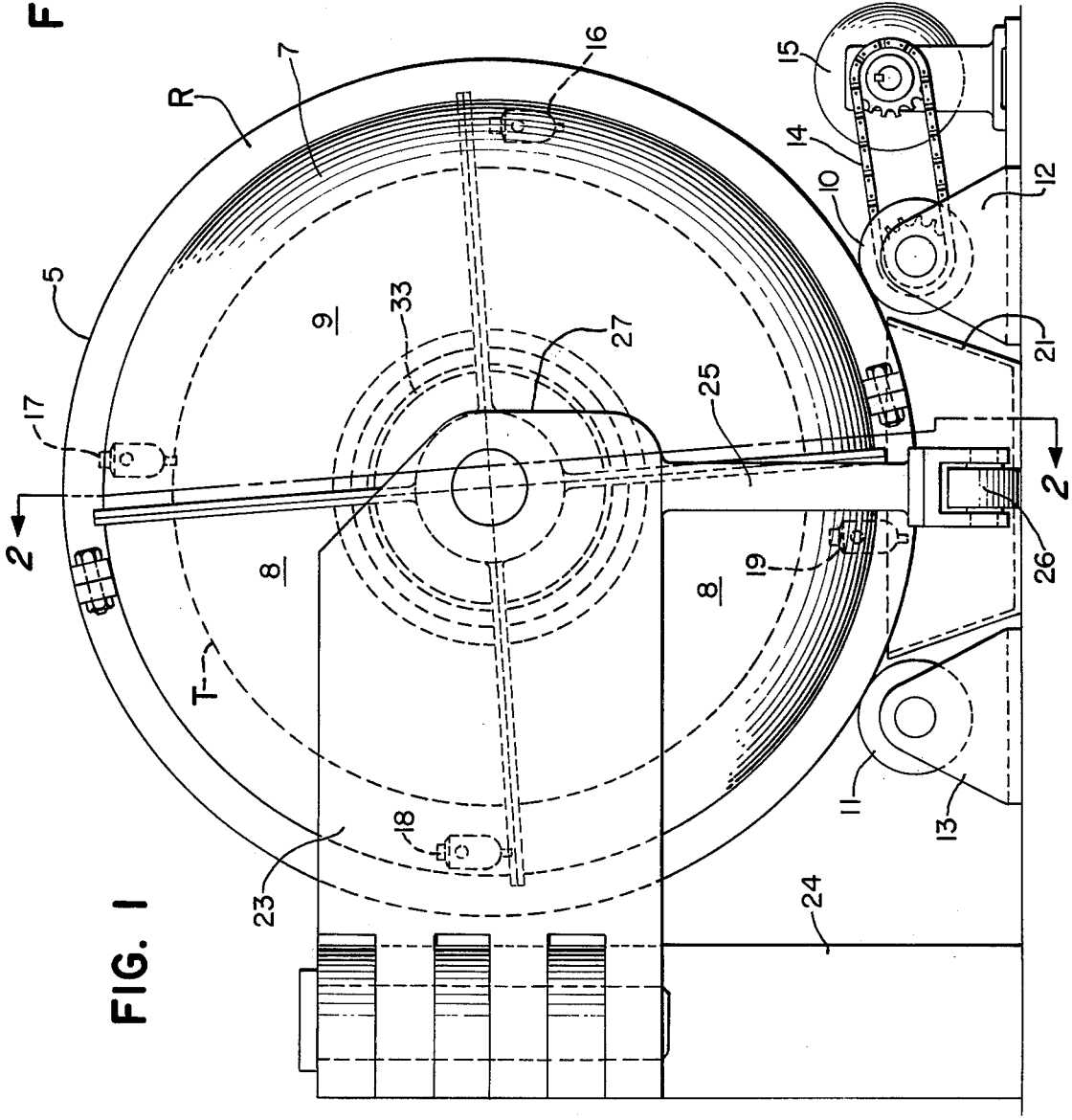
FIG. 1 is a side view of a curing kettle made in accordance with the invention.

The sections 6 and 7 of the kettle 5 are supported in vertical relation on a pair of elongated rollers 10 and 11 which are parallel and journalled for rotation on a pair of brackets 12 and 13 which, in turn, are secured in fixed, spaced relation on the floor of a temporary building (not shown). The right roller 10 (FIG. 1) is coupled by a drive belt 14 to a motor 15 used for driving at least one roller to rotate the kettle 5.

A plurality of standard steam traps 16–19 are conventionally mounted in equally spaced relation around at least one of the sections, e.g. section 6, adjacent the inner periphery 20 of the kettle 5 which is also the outer periphery of the chamber C formed in the kettle 5. Thus, any condensate in the kettle 5 will drain from the steam traps 16–19 into an adjacent discharge tank 21, when the traps 16–19 reach their lowermost positions as exemplified by the position of steam trap 19 in FIGS. 1 and 2.

Any appropriate vulcanizing medium, e.g. steam, is circulated through a conduit 22, centrally disposed in the right section 6 (FIG. 2), into the chamber C for contacting the tire T to heat and cure any unvulcanized rubber material used in repairing or retreading the tire T.

The sections 6 and 7 of the kettle 5 are mounted for relative movement such that the kettle 5 can be opened and closed. For example, the left section 7 (FIG. 2) is rotatably mounted on a rigid, outstanding arm 23 which is pivotally hinged to a pivot pin 24 extending vertically from the floor of the building housing the kettle 5. The pivot arm 23 is designed to rotate in a horizontal plane and about the longitudinal axis of the pivot pin 24. A leg 25, mounted on a caster 26, is secured to the free end 27 of the pivot arm 23 for supporting the left section 7 when it is swung free of the right section 6 and rollers 10 and 11, and to a position where the kettle 5 is open.

Because of the large diameter of the kettle 5, e.g. 24 feet, the temperature within the steam chamber C varies appreciably from top to bottom of the kettle 5. The tire T must be rotated within the steam chamber C to insure exposing every portion of the tire to the same temperatures. Otherwise, the tire T will not be uniformly cured.

Curing kettles presently employed in retreading and repairing operations are stationary and utilize rollers for suspending and rotating a tire within the steam chamber of the kettle. These rollers engage and break down the bead portions of the tire because of the tremendous weight of the tire. This particular problem is overcome by properly mounting the tire on the kettle and then rotating both the kettle and tire, in unison.

Thus, the tire T is mounted on a rim 28 with outstanding flanges 29 and 30 for properly seating the beads and supposrting the tire T. The supporting rim 28 is provided with a number of openings, e.g. openings 31, for allowing the passage of steam into the tire cavity 32 to heat and vulcanize any unvulcanized rubber patches within the tire cavity 32. The rim 28 is preferably secured to the sections 6 and 7 for unitary rotation with the kettle 5 by any suitable means. For example, the rim 28 is keyed to an elongated cylindrical bracket 33 which extends between the sections 6 and 7 and is locked thereto, such that the rim 28 is concentric with the center axis A—A about which the kettle 5 is symmetrical and rotated.

The kettle 5 may be enlarged to accommodate a number of tires by bolting an annular spacing ring (not shown) between the opposing sections 6 and 7 of the kettle 5. Thus, the overall depth D of the steam chamber C can be increased to accommodate two or possibly three tires, which may prove important in certain operations, since the curing time of some of the larger repairs may be 15 to 20 hours.

Thus, there has been provided a large rotatable kettle used in repairing and retreading huge earthmover tires. The beads of the tire are firmly seated on a rim which is mounted for unitary rotation with the kettle, and any damage to the beads caused by improperly supporting the tire is eliminated.

What is claimed is:

1. A kettle used in repairing or retreading tires, comprising:
   a. at least two opposing sections forming a chamber for receiving a tire;
   b. means for mounting the sections for unitary rotation about an axis angularly disposed to a vertical plane; and
   c. means for mounting a tire in the chamber for unitary rotation with the sections and rotation about the rotational axis of the sections.

2. The kettle of claim 1, which includes means for locking the sections together to seal the chamber from the ambient atmosphere.

3. The kettle of claim 1, which includes means for circulating heated fluid in the chamber to heat and vulcanize uncured rubber material on a tire positioned in the chamber.

4. The kettle of claim 1, wherein the means (b) for mounting the sections includes at least one pair of rollers disposed in spaced relation for supporting the sections of the kettle.

5. The kettle of claim 4, which includes means for rotating at least one of the rollers to rotate the sections of the kettle.

6. The kettle of claim 1, which includes means for supporting at least one of the sections as the sections are moved relative to each other to open the kettle.

7. The kettle of claim 1, wherein the means (c) for mounting the tire in the chamber includes a rim with upstanding flanges, the rim having openings through which heated fluid is circulated into the cavity of the tire mounted on the rim, and means for securing the rim to the sections for unitary rotation with the kettle.

8. The kettle of claim 1, which includes a plurality of steam traps spaced around at least one of the sections of the kettle, each steam trap communicating with the chamber adjacent the inner periphery of the sections whereby condensed fluid trapped in the chamber is allowed to flow therefrom.

9. The kettle of claim 1, wherein each section of the kettle includes at least two segments, and means for fastening the segments together.

10. A kettle used in repairing or retreading tires, comprising:
    a. at least two circular sections which are vertically disposed and form a chamber for receiving a tire when the kettle is closed, each section including two semi-circular segments which are secured together;
    b. means for locking the sections together to seal the chamber from the ambient atmosphere;
    c. at least one pair of spaced rollers for rotatably supporting the sections in parallel relation;
    d. means for rotating at least one of the rollers to consequently rotate the kettle about its center axis;
    e. means for mounting at least one tire within the chamber for unitary rotation with the sections and rotation about the rotational axis of the sections;
    f. means for circulating heated fluid in the chamber to heat and vulcanize uncured rubber material on a tire positioned therein; and
    g. means for discharging condensed fluid, trapped in the chamber, from the kettle.

11. The kettle of claim 10, wherein the means (b) for locking the sections together includes at least one ring surrounding the sections, and means for locking the ring in engaged relation with the sections.

12. The kettle of claim 11, which includes means for supporting at least one of the sections as it is moved towards and away from the other section, whereby the kettle is closed and opened.

13. The kettle of claim 12, wherein the tire mounting means (e) includes a rim with outstanding flanges, and means for securing the rim to the sections for unitary rotation of the kettle and tire on the rim.

14. The kettle of claim 13, which includes an annular spacer ring insertable between the opposing sections for increasing the depth D of the chamber.

* * * * *